United States Patent
Yamamoto et al.

(10) Patent No.: US 10,951,518 B2
(45) Date of Patent: Mar. 16, 2021

(54) PACKET ROUTING ARCHITECTURE USING A REGISTRY

(71) Applicant: Schweitzer Engineering Laboratories, Inc., Pullman, WA (US)

(72) Inventors: Kenji R. Yamamoto, Pullman, WA (US); Rohan Shroff, Pullman, WA (US); Sudhirkumar Menon, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 47 days.

(21) Appl. No.: 16/236,907

(22) Filed: Dec. 31, 2018

(65) Prior Publication Data
US 2020/0213220 A1    Jul. 2, 2020

(51) Int. Cl.
*H04L 12/725*    (2013.01)
*H04L 12/721*    (2013.01)

(52) U.S. Cl.
CPC ............ *H04L 45/306* (2013.01); *H04L 45/44* (2013.01)

(58) Field of Classification Search
CPC ....... H04L 45/306; H04L 45/44; H04L 61/00; H04L 65/1073
See application file for complete search history.

(56) References Cited

U.S. PATENT DOCUMENTS

| | | | | |
|---|---|---|---|---|
| 5,974,085 A | * | 10/1999 | Smith | H04L 29/06 375/222 |
| 8,090,849 B2 | * | 1/2012 | Peacock | H04L 12/66 709/224 |
| 8,868,781 B2 | * | 10/2014 | Little | G06F 9/546 709/232 |
| 9,270,585 B2 | | 2/2016 | Manion | |
| 2002/0143819 A1 | * | 10/2002 | Han | G06F 16/958 715/237 |
| 2003/0210694 A1 | | 11/2003 | Jayaraman | |
| 2008/0065683 A1 | * | 3/2008 | Theeten | H04L 67/16 |
| 2009/0019120 A1 | * | 1/2009 | Muguda | G06Q 10/107 709/206 |
| 2012/0036233 A1 | * | 2/2012 | Scahill | H04L 61/2076 709/220 |
| 2015/0271270 A1 | * | 9/2015 | Edlund | H04L 12/4633 709/227 |
| 2019/0036972 A1 | * | 1/2019 | Inoue | H04L 41/50 |

* cited by examiner

*Primary Examiner* — Kibrom T Hailu
(74) *Attorney, Agent, or Firm* — Bradley W. Schield

(57) ABSTRACT

The present disclosure relates to packet routing using a registry to communicate packets between a first service and a second service of an electronic device. The electronic device may have memory that includes a registry having a table of services with at least one memory address of the second service being associated with consuming at least one packet type. The electronic device may store, in the first service, the at least one memory address of the second service and the at least one packet type. The electronic device may produce, via the first service, at least one packet of the at least one packet type. The electronic device may provide the at least one packet to the at least one memory address associated with the second service to allow the second service to consume data of the at least one packet.

18 Claims, 6 Drawing Sheets

PACKET ROUTING ARCHITECTURE USING A REGISTRY

TECHNICAL FIELD

The present disclosure relates generally to packet routing and, more particularly, to routing packets using a registry.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

Figure 1:
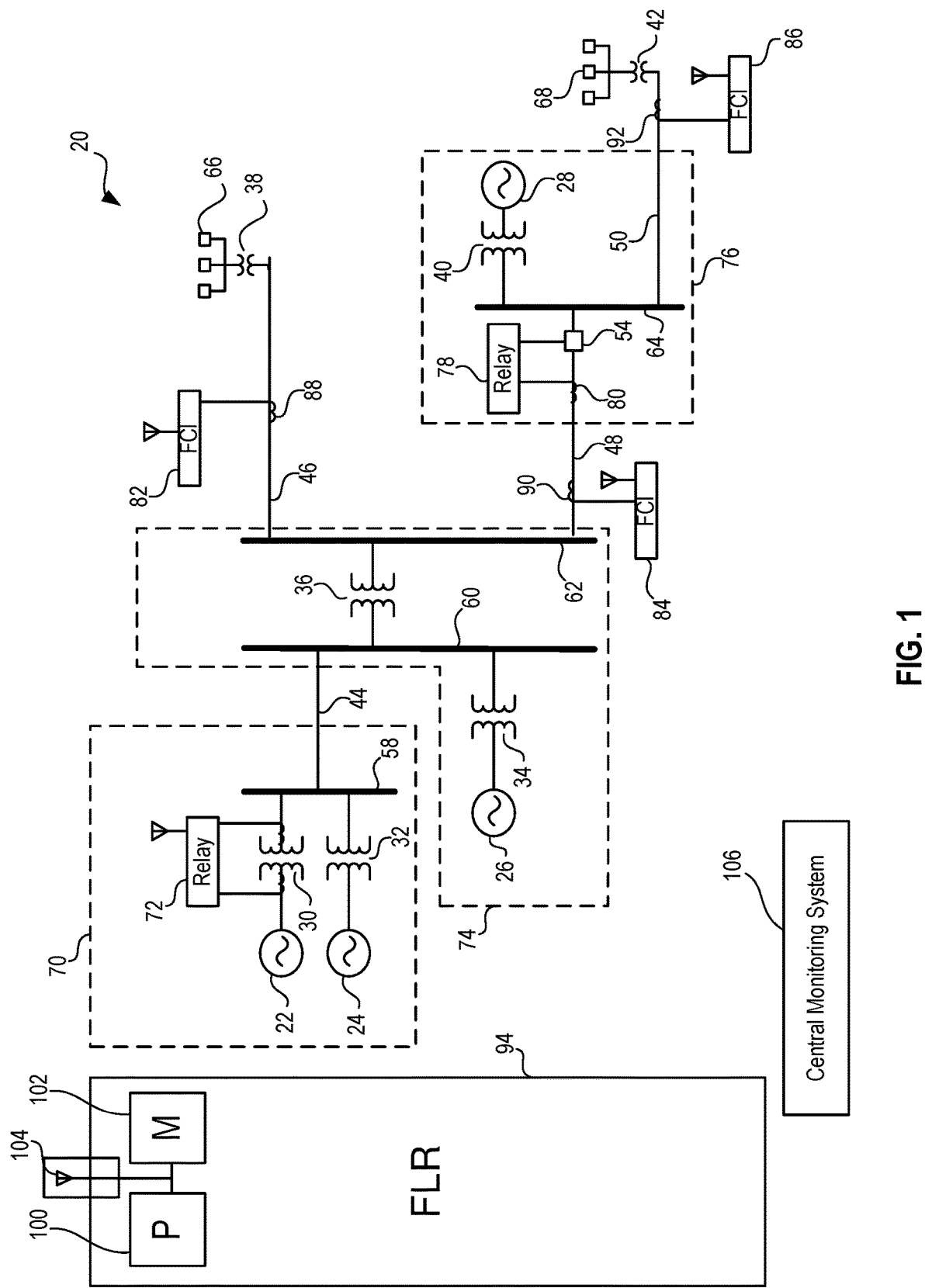
FIG. 1 illustrates a one-line diagram of an electric power delivery system that uses a communication network to communicate power system data between faulted circuit indicators (FCIs) and an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems are used to distribute electric power from electric power generation sources to loads. Such systems may include generators or other sources, transformers that step up or down voltages, transmission lines, buses, distribution lines, voltage regulators, capacitor banks, reactors, circuit breakers, switches, and other such equipment. Electric power delivery equipment may be monitored, automated and/or protected using intelligent electronic devices (IEDs).

An electronic device, such as a fault and load receiver (FLR), in the electric power delivery system may receive data from various IEDs in electric power delivery systems. To manage processes on the electronic device, services may be run (e.g., dynamically created) that represent functionality performed on the electronic device. For example, if an electronic device were to communicate a software update to IEDs in an electric power delivery system, various services may be dynamically created by the electronic device to manage the software and/or backend of the electronic device to allow for transmission of the data in the update. These services may communicate with each other using a central routing master that routes packets to each of the services on the electronic device.

However, as more services are created, routing designs that use a central routing master to route packets to the various services may result in a bottleneck at the central routing master. For example, as each additional service routes data through the central router, the router may use a longer routing table to identify where to route data. Further, more services in the system may result in more data being communicated through the central router which may result in delays due the central router processing the data. Accordingly, there is a need in the field to efficiently communicate data between services.

As explained below, an electronic device may use a registry that allows the services to route packets to each other without the packets being routed through a central routing master. The registry may include a list of services and the types of data packets consumed and produced by each service. Consumed packets may refer to data that is used (e.g., read from memory) in performing tasks of the service. Produced packets may refer to data that is output (e.g., written into memory) in performing tasks of the service. As the state of active services in the routing architecture changes, the list of services may be updated. For instance, a service, as well as the types of data packets consumed and produced by the service, may be added to the registry when the service is active and removed when the service is inactive. The registry may provide routing information to the active services in the routing architecture that produce packets of the type consumed by the added service. The services may then route packets using the routing information to the consuming services.

FIG. 1 is a simplified one-line diagram of an alternating current (AC) electric power delivery system 20 consistent with embodiments of the present disclosure. The electric power delivery system 20 may be configured to generate, transmit, and distribute electric energy to loads. The electric power delivery system 20 may include equipment, such as electric generators 22, 24, 26, and 28, power transformers 30, 32, 34, 36, 38, 40 and 42, power transmission and distribution lines 44, 46, 48, and 50, a circuit breaker 54, buses 58, 60, 62, and 64, loads 66 and 68, and the like. A variety of other types of equipment may also be included in the electric power delivery system 20, such as voltage regulators, capacitor banks, and a variety of other types of equipment.

A first substation 70 may include the electric generators 22 and 24 feeding the bus 58 via respective transformers 30 and 32. The transformer 30 may be monitored and protected using an IED 72, such as a relay. A second substation 74 may include the electric generator 26, which may be a distributed generator, and which may be connected to bus 60 through the step-up transformer 34. The bus 58 may be connected to the bus 60 via the transmission line 44. The bus 60 may be connected to a distribution bus 62 via a step-down transformer 36. The distribution lines 46 and 48 may be connected to distribution bus 62. The load 66 may be fed from distribution line 46. The step-down transformer 38 may be in communication with distribution bus 62 via distribution line 46 and may be used to step down a voltage for consumption by the load 66.

The distribution line 48 may lead to substation 76, and deliver electric power to the bus 64. The bus 64 may also receive electric power from distributed generator 28 via the transformer 40. The distribution line 50 may deliver electric power from the bus 64 to the load 68, and may include further step-down transformer 42. The circuit breaker 54 may be controlled by an IED 78, such as a relay, that detects current on the distribution line, via a current transformer 80, and controls the circuit breaker 54 based on the detected current.

The electric power delivery system 20 may include electronic devices, such as faulted circuit indicators (FCIs) 82, 84, and 86, that monitor the power lines 46, 48, and 50 to detect events in the electric power delivery system 20. The FCIs 82, 84, and 86 may each include a respective current transformer (CT) 88, 90, and 92 that detects current through the distribution line 46, 48, and 50. Further, each of the FCIs 82, 84, and 86 may harvest power, via the current transformer 88, 90, and 92 from the power lines 46, 48, and 50 to power the FCI.

Each of the FCIs 82, 84, and 86 may communicate with an electronic device 94, such as a fault and load receiver (FLR). The electronic device 94 may include a processor 100 and a memory 102. The electronic device 94 may receive data from the FCIs 82, 84, and 86. While three FCIs are shown in the illustrated embodiment, more FCIs and other IEDs may be used to better monitor various aspects of the electric power delivery system 20.

The electronic device 94 may include one or more buses connecting the processor(s) 100 or processing unit(s) to the memory 102 or another computer-readable storage medium and/or communication circuitry, which may include transceiver 104. In some embodiments, the electronic device 94 may include various input structures (e.g., keyboard, mouse, touchscreens) and/or output structures (e.g., displays, light emitting diodes (LEDs), etc.) to receive inputs from and/or provide outputs to a user. In the illustrated embodiment, the electronic device 94 may send power system data (e.g., voltages, currents, events, circuit breaker status, etc.) to a central monitoring system 106 to allow an operator to analyze the power system on a display at the central monitoring system.

The memory 102 may include any suitable computer-readable storage medium and may include or interface with software, hardware, or firmware modules for implementing various portions of the systems and methods described herein. The memory 102 may be the repository of one or more modules and/or executable instructions configured to implement any of the processes described herein. The memory 100 may include any suitable articles of manufacture for storing data and executable instructions, such as random-access memory, read-only memory, rewritable flash memory, hard drives, or any other suitable optical, magnetic, or solid-state storage medium, or a combination thereof. In some embodiments, the memory 102 and the processes herein may all be implemented as hardware components, such as via discrete electrical components, via a Field Programmable Gate Array ("FPGA"), and/or via one or more Application Specific Integrated Circuits ("ASICs").

The processor 100 may be configured to process inputs received via the transceiver 104. The processor 100 may operate using any number of processing rates and architectures. The processor 100 may be configured to perform various algorithms and calculations described herein using computer executable instructions stored on the memory 102. The processor 100 may be embodied as a microprocessor, a general purpose integrated circuit, an ASIC, a FPGA, and/or other programmable logic devices. In some embodiments, the processor 100 and/or the memory 102 may be referred to generally as processing circuitry.

As more IEDs are added to the electric power delivery system 20, more data may be communicated with the electronic device 94. To manage tasks, the electronic device 94 may run services to perform various processes. For instance, services may include firmware upgrades, settings updates, diagnostic data, and command/controls, among others. As an example, to provide a firmware update to the FCIs 82, 84, and 86, services may be dynamically created on the electronic device to retrieve the firmware from memory 102, to compare to versions on the FCIs 82, 84, and 86, and to prepare the transceiver of the electronic device 94 to communicate the data, or the like.

Figure 2:
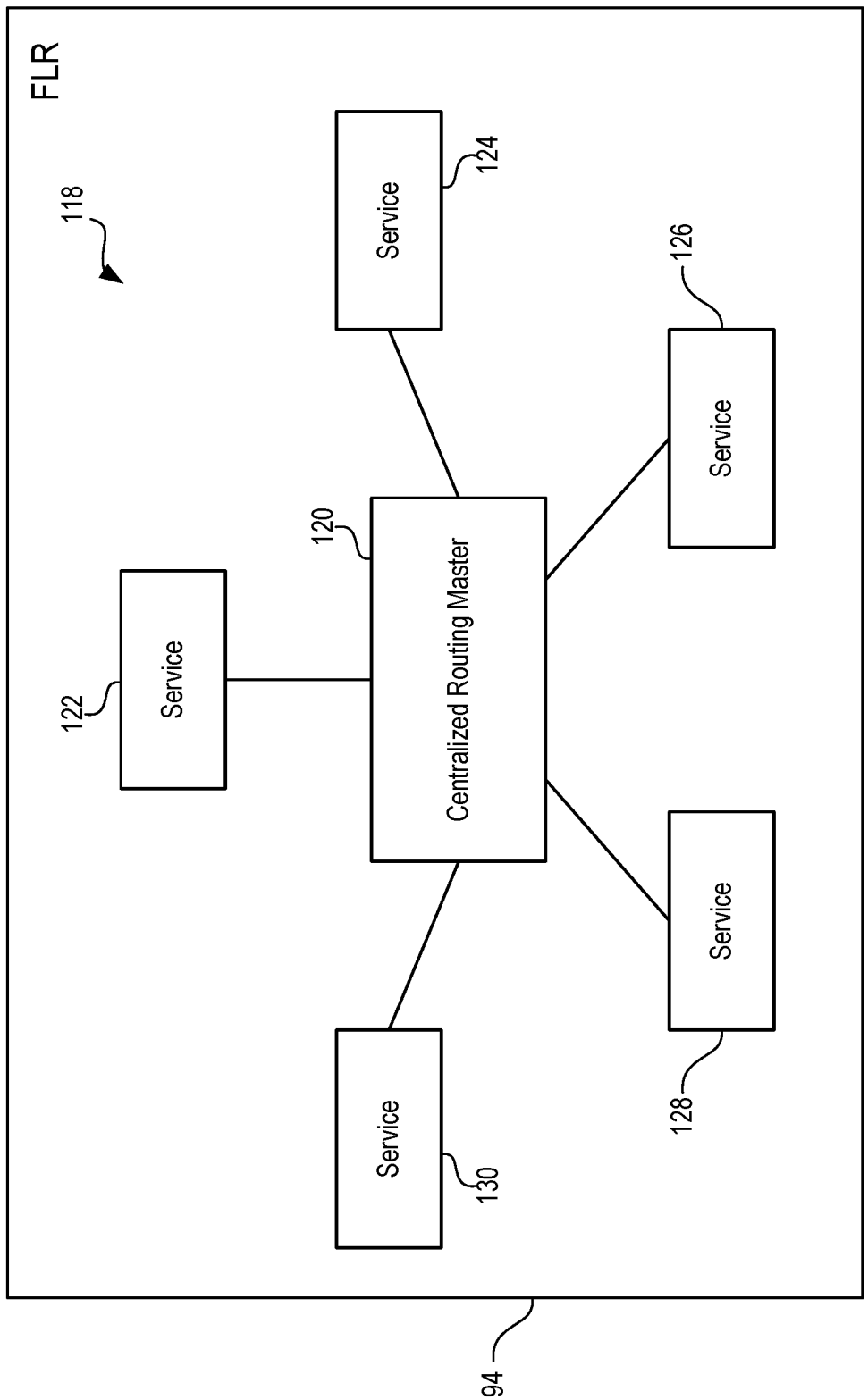
FIG. 2 illustrates a block diagram of a routing architecture of services on the electronic device of FIG. 1, in accordance with an embodiment.

FIG. 2 is a block diagram of a routing architecture 118 of services on the electronic device 94. The routing architecture 118 may be such that a centralized routing master 120 routes the packets of data between services 122, 124, 126, 128, and 130. That is, the processor(s) 100 may execute instructions for performing each of the services, and each of the services 122, 124, 126, 128, 130 may communicate data to each other through the centralized routing master 120. For instance, if service 122 produces data that service 124 uses, service 122 may send a packet of the data to the centralized routing master 120 to allow the centralized routing master 120 to route the packet to the service 124.

However, this routing architecture 118 may result in a bottleneck at the centralized routing master 120. In the example described with FIG. 1, as more FCIs are added to the network and/or more services are performed by the FLR, more data is routed through the centralized routing master 120. Because the centralized routing master 120 manages communication of each packet through the routing architecture 118, traffic congestion at the centralized routing master 120 may result in packet delivery delays and/or packet losses. Accordingly, there is a need to develop new routing techniques to more efficiently manage communication of packets between services.

Figure 3:
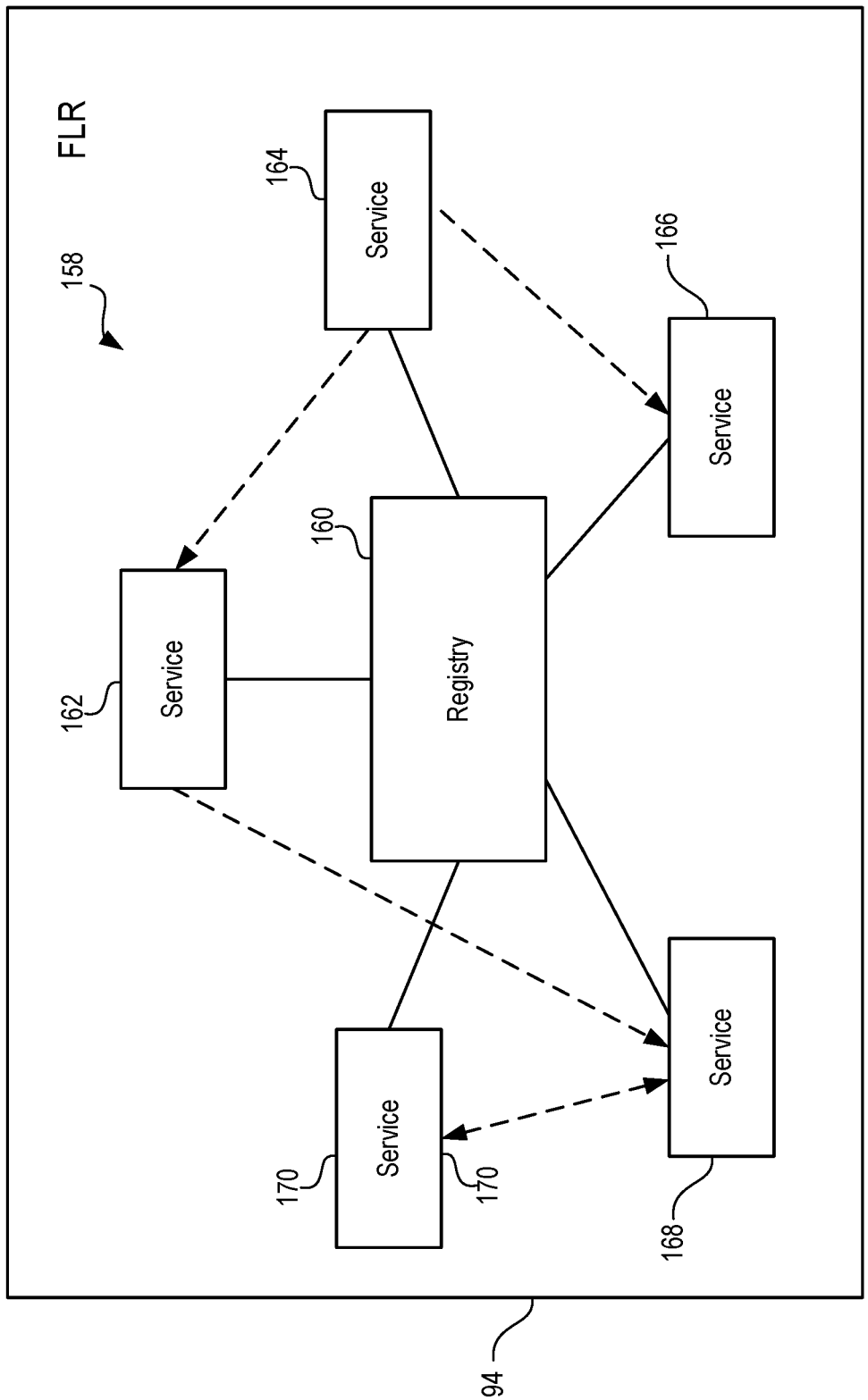
FIG. 3 illustrates a block diagram of another routing architecture of services on the electronic device of FIG. 1, in accordance with an embodiment.

FIG. 3 is a block diagram of a distributed routing architecture 158 that uses a registry 160 to distribute routing information to allow the services 162, 164, 166, 168, and 170 to communicate packets of data with each other. For example, by distributing the routing information to the services 162, 164, 166, 168, and 170, the service 162 may provide data directly to a memory address associated with the service 168 to allow the service 168 to use the data.

In the illustrated embodiment, each service 162, 164, 166, 168, and 170 may provide to the registry 160 a set of packet types that the service consumes and produces. The registry 160 may store a list of the active services and packet types that each service consumes and produces. When the state of the routing architecture 158 changes, the changes to the services 162, 164, 166, 168, and 170 may be sent to the registry 160 to update the list of active services and packet types. That is, the registry 160 may store metadata to allow each of the services 162, 164, 166, 168, and 170 to communicate with each other.

Further, the registry 160 may provide updates to the services 162, 164, 166, 168, and 170 when changes to the list of active services occur. For example, if service 164 is updated to produce an additional type of packet that is consumed by services 162 and 166, the registry 160 may receive the updated packet type list from service 164 and provide an indication of memory addresses in which to provide the additional type of packet to services 162 and 166. The indication of the memory address may be, for example, a word of memory containing the memory address (e.g., a pointer) in which to provide packets.

Figure 4:
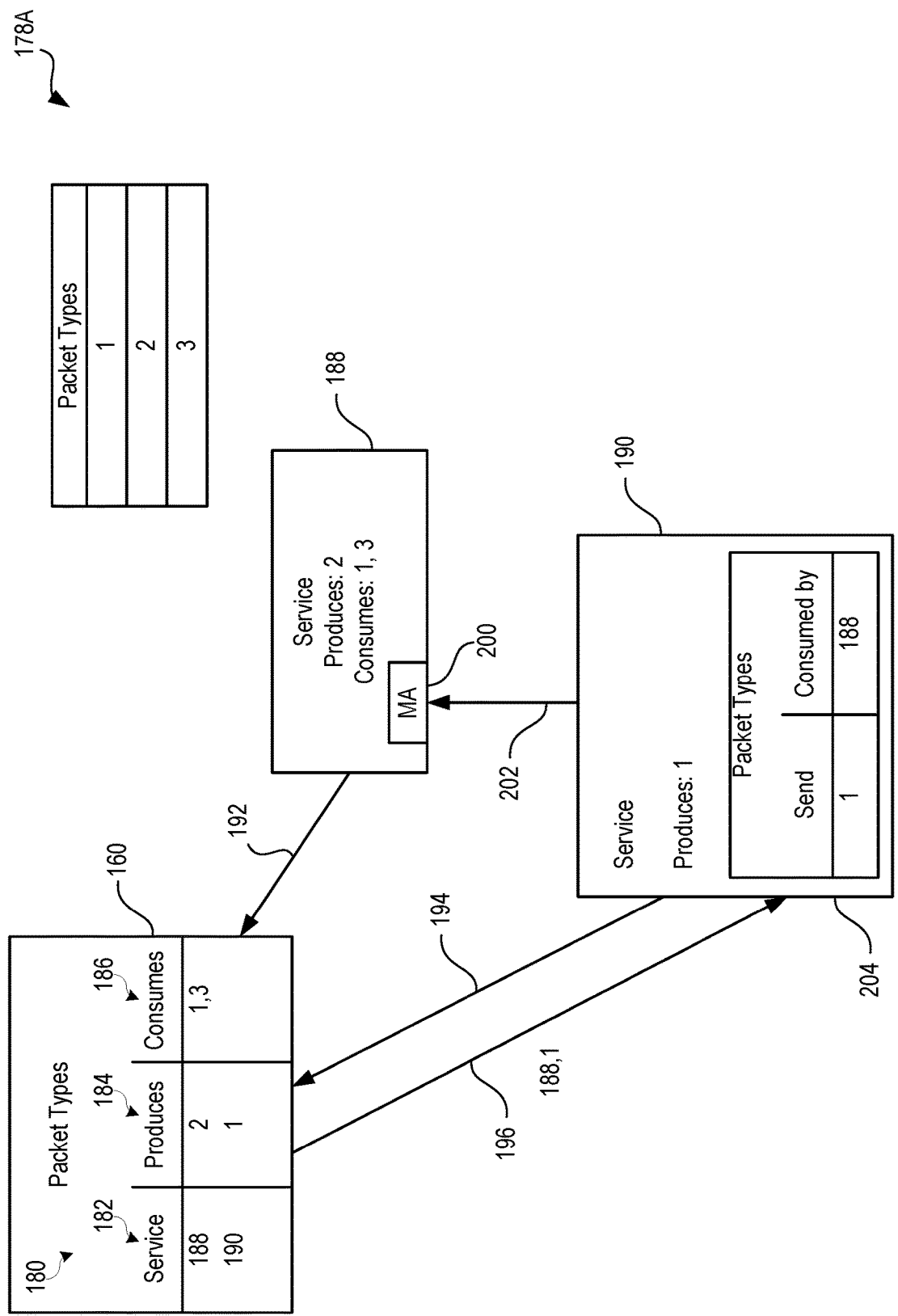
FIG. 4 illustrates a block diagram of the routing architecture of FIG. 3 in a first state, in accordance with an embodiment.

FIG. 4 is a block diagram of an example of the electronic device that uses the routing architecture 158 in a first state 178A. The routing architecture 158 includes the registry 160 to allow services 188 and 190 to communicate data to each other without routing packets through a central routing master. The registry 160 may include a table 180 having a list 182 of services with packet types that each service produces 184 and consumes 186.

In the illustrated embodiment, the electronic device 94 operates with two active services, service 188 and service 190. Active services may refer to services that have functionality (e.g., instructions) scheduled to or being performed by the processor 100. The routing architecture 158 includes packet types 1, 2, and 3. A packet type may refer to different types of data that are communicated between services. As an example, a first packet type may be status information regarding the electronic device 94, and a second packet type may be data received by the transceiver of the electronic device 94. Note that while these are given as examples of packet types, any suitable packet types may be used and packet types may depend on the application of the electronic device 94 and/or state of the electronic device 94.

As an example, service 188 may consume packets of type 1 and 3 and produce packets of type 2. Service 190 may produce packets of type 1. The services 188 and 190 may provide 192 and 194 the types of packets that each service consumes and produces to allow the registry 160 to create the table 180. The processor 100 may determine, via the table 180, that service 190 produces a type of packet consumed by service 188 (packet type 1). That is, the processor 100 may compare the types of packets consumed by each service to the types of packets produced by each service. The registry 160 may then provide 196 routing information to the service 190, which may include an indication of a memory address 200 in which to provide 202 packets of the packet type 1 to service 188 when service 190 produces such packets. By acquiring the memory address 200, the service 190 may then provide, without using a central routing master, packets of packet type 1 to the memory address 200 associated with service 188 to allow service 188 to use the data of the packet. The memory address 200 may be a preset location in the memory 102 in which service 188 is set to receive packets of type 1. In some embodiments, the memory 102 of each service 188 and 190 may be co-located such that the services 188 and 190 may access (e.g., write to) the memory addresses of the other service.

The service 190 may store the memory address 200 associated with the packet type to be sent, as shown in the table 204. Upon a change in state 178A of the routing architecture 158, such as adding a service, removing a service, adding a packet type consumed by a service, removing a packet type consumed by a service, or the like, the processor 100 may update the registry 160.

Figure 5:
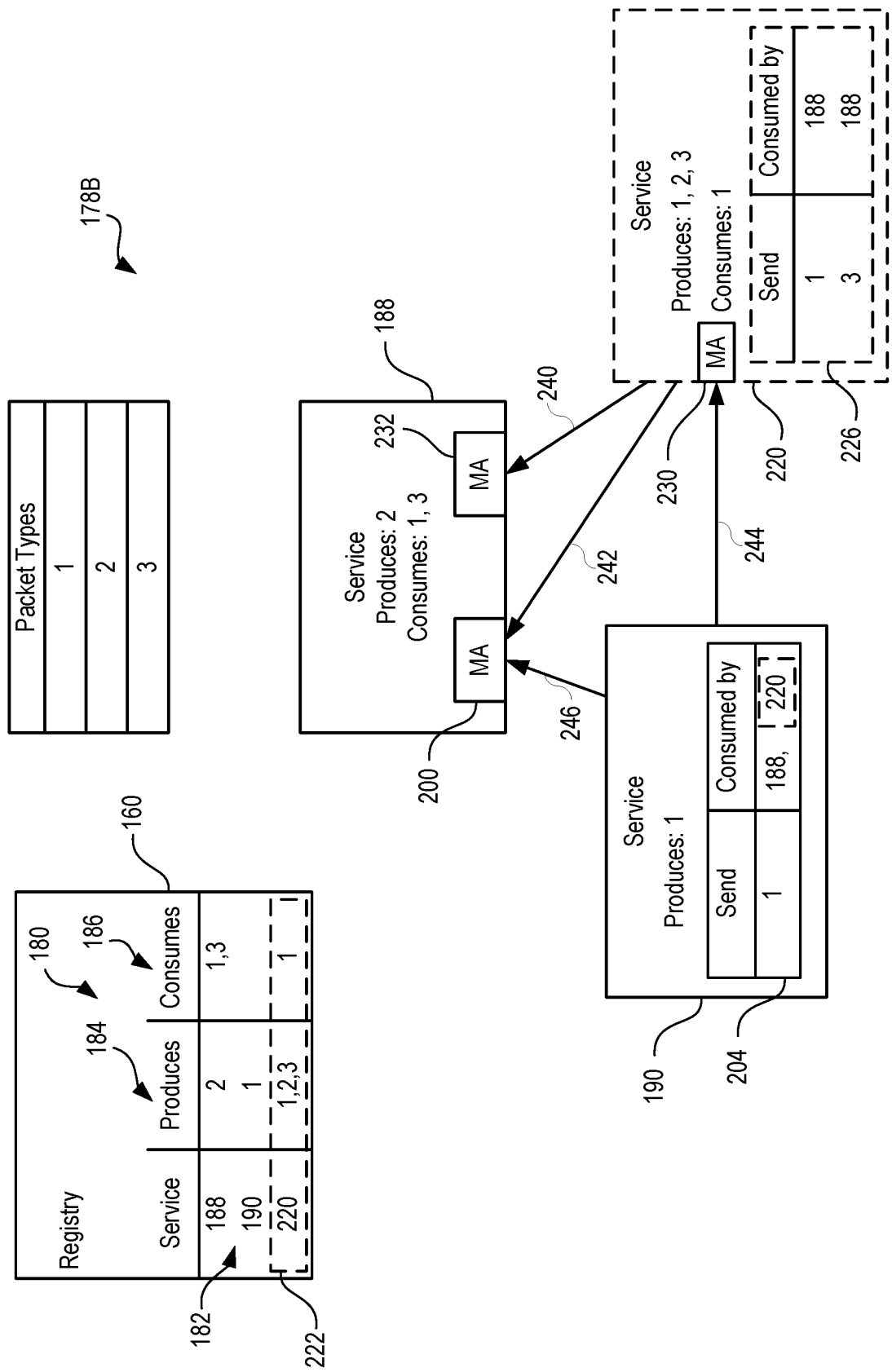
FIG. 5 illustrates a block diagram of the routing architecture of FIG. 3 in a second state, in accordance with an embodiment.

FIG. 5 is the routing architecture 158 shown in another state 178B. In the illustrated embodiment, a new service 220 has started from the previous state 178A. The added active service 220 may provide to the registry 160 the packet types consumed and produced by the service 220. The processor 100 may update the registry 160 to include the service 220 and the associated packet types consumed and produced by the service 220. In the illustrated embodiment, the service 220 produces packet types 1, 2, and 3 and consumes packet type 1, which are added to the registry 160 in row 222. Upon updating the registry 160, the registry 160 may provide updates to the services 188, 190, and 220 that have changes in the consumed by lists 204 and 226.

Each of the services 188, 190, and 220 may store an updated list 204 and 226 that indicates memory addresses of services that consume packets produced by that service. For example, service 190 produces packets of type 1 which are consumed by services 188 and 220. The service 190 may store the memory addresses of each service along with the associated packet type to send data to that service. In the illustrated embodiment, the service 190 may store a memory address 200 in which service 188 receives packets of packet type 1 and a memory address 230 in which service 220 receives packets of packet type 1. Further, the new service 220 may store a table 226 that includes memory addresses 200 and 232 from which the service 188 consumes packets of types 1 and 3 respectively. For example, service 188 may consume packets of type 1 that are provided to memory address 200 from services 190 and 220 and consume packets of type 3 that are provided to memory address 232 from service 220. In some embodiments, the registry 160 may store each of the channels 240, 242, 244, and 246 that have been communicated to the services to determine when to communicate changes in the channels to the services 188, 190, and 220. For example, the registry 160 may add and/or remove a channel from a list of channels that have been communicated. For instance, if service 220 stops consuming packets of type 1, service 220 may inform the registry of the change and the registry may update the consumes 186 list to reflect the change as well as remove channel 244 from a list of channels stored in the registry 160 to track channels communicated to the services.

Figure 6:
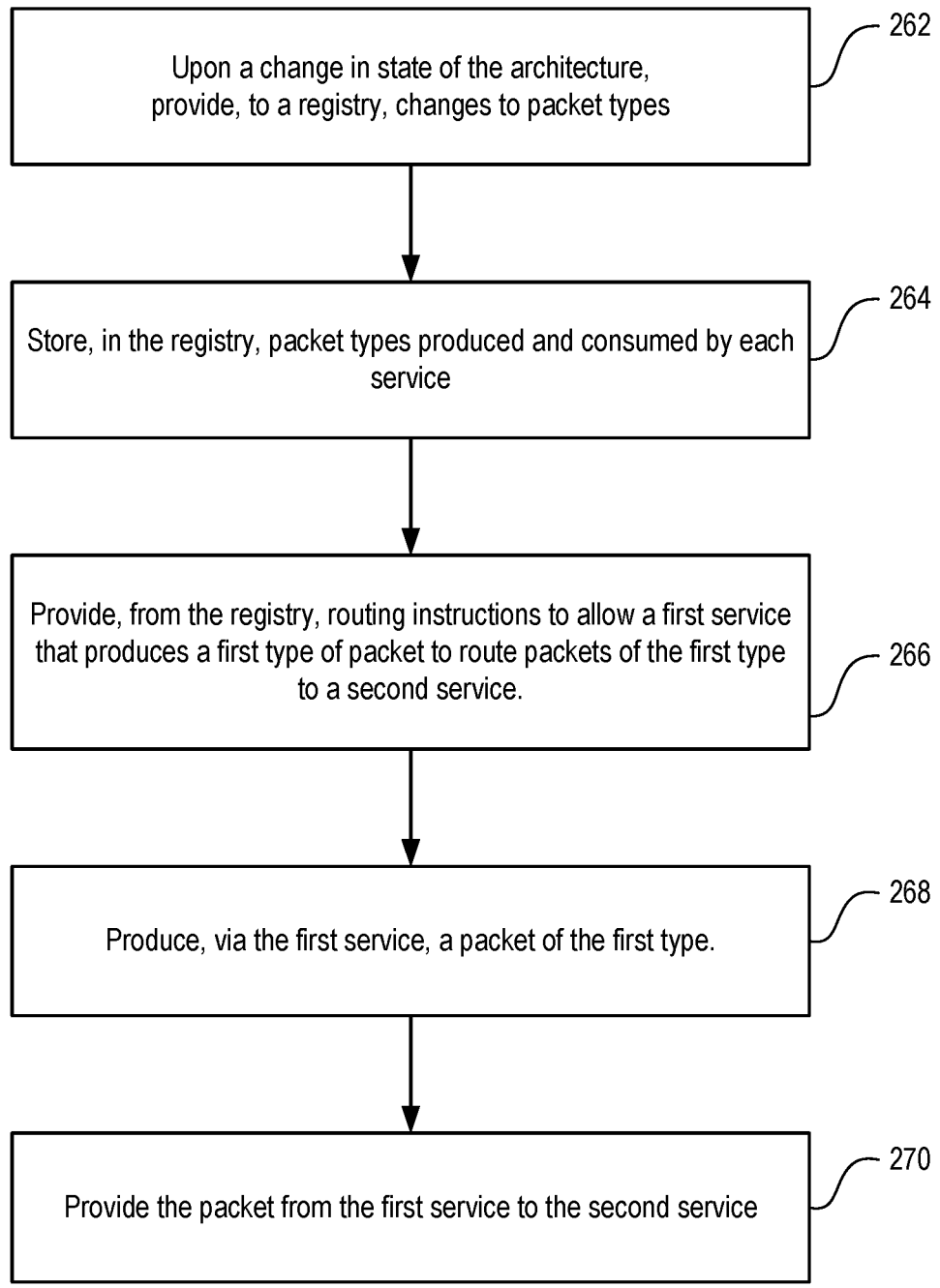
FIG. 6 illustrates a flow diagram of a process performed by the electronic device of FIG. 1, in accordance with an embodiment.

FIG. 6 is a flow chart of a process 260 that may be performed by the processor 100 using a routing architecture 158 that has a registry 160. The process 260 may be stored in one or more non-transitory computer readable media, such as the memory 102. The process 260 may begin with a change in the state of the routing architecture. As mentioned above, a change in the state of the architecture may include an active service that is added or removed, or a change in packet types produced or consumed by a service. Upon a change in the state of the architecture, any changes in the packet types consumed or produced may be provided to the registry (block 262). The registry may store the packet types produced and consumed by each active service in the routing architecture (block 264).

The registry may then provide routing instructions (e.g., a memory address, a pointer to a memory address, etc.) to allow a first service that produces a first type of packet to provide packets of the first type to a second service that consumes packets of the first type (block 266). In some embodiments, the registry may provide, to the first service, a subset of the total direction graph (i.e., routing information of the consuming services from the list). The subset may be a smaller set than the total direction graph. That is, a first service may have routing directions to a first portion of the total routing information, and a second service may have routing directions to a second portion of the total routing information, different than the first portion. Further, the subset of routing information stored with each service may be limited according to the packet types consumed by other services in the total direction graph as well as limited according to the packet types produced by that service.

The first service may then produce a packet of the first type (block 268). The first service may then provide the packet to the second service via the routing instructions (block 270). For example, the first service may provide the packet directly to a memory address of the second service without routing the packet to the registry.

The electronic device may process data faster by operating services in a routing architecture that distributes routing information to allow services to communicate data with each other. This may allow the electronic device to communicate with additional electronic devices. For example, in a power system network, a distributed routing architecture in which a registry distributes routing information to services may allow a fault and load receiver to communicate with additional faulted circuit indicators or to run additional services, thereby increasing the functionality and/or processing speed of the electronic device. Due to improved processing speed and/or additional functionality that may be performed by the electronic device, power systems may be better monitored and/or protected through more timely protective actions.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory, computer readable medium comprising instructions stored thereon, which, when executed by a processor, causes the processor to perform operations comprising:
   providing, from a registry to a first service, an indication of at least one memory address associated with a second service in a list of services in the registry, wherein the second service consumes packets of a first type, and wherein the first service and the second service are co-located in memory such that the first service has access to the at least one memory address;
   producing, via the first service, at least one packet of the first type; and
   providing, from the first service, the at least one packet directly by writing to the at least one memory address without additional routing of the at least one packet to allow the second service to consume data of the at least one packet.

2. The non-transitory, computer readable medium of claim 1, comprising instructions, which, when executed by a processor, causes the processor to perform operations comprising providing, from the second service to the registry, an identification of any packet types consumed by the second service.

3. The non-transitory, computer readable medium of claim 1, comprising instructions, which, when executed by a processor, causes the processor to perform operations comprising upon receiving, via the first service, the indication of the memory address, and storing, via the first service, an identification of the first type of packets consumed by the second service along with the at least one memory address.

4. The non-transitory, computer readable medium of claim 1, comprising instructions, which, when executed by a processor, causes the processor to perform operations comprising storing, in the registry, types of packets produced and consumed by each of the services in the list of services.

5. The non-transitory, computer readable medium of claim 1, comprising instructions, which, when executed by a processor, causes the processor to perform operations comprising providing, to the first service, a subset of a total direction graph of routing information between services in the list of services.

6. An electronic device configured to communicate packets between a first service and a second service on the electronic device, comprising:
   memory comprising a registry having a table of services with at least one memory address of the second service associated with consuming at least one packet type, wherein the first service and the second service are co-located in the memory such that the first service has access to the at least one memory address; and
   a processor operatively coupled to the memory, wherein the processor is configured to:
      store, via the first service, the at least one memory address of the second service and the at least one packet type;
      produce, via the first service, at least one packet of the at least one packet type; and
      provide, from the first service, the at least one packet directly to the at least one memory address by writing to the at least one memory address associated with the second service without additional routing of the at least one packet to allow the second service to consume data of the at least one packet.

7. The electronic device of claim 6, wherein the processor is configured to provide, from the registry to the first service, the at least one memory address upon a change in a state of a routing architecture in the electronic device.

8. The electronic device of claim 7, wherein the change in the state of the routing architecture comprises adding the second service as an active service.

9. The electronic device of claim 7, wherein the change in the state of the routing architecture comprises changing packet types being consumed by the second service.

10. The electronic device of claim 6, wherein the processor is configured to cause the registry to provide a subset of a total direction graph of routing information in the electronic device to the first service.

11. The electronic device of claim 6, wherein the processor is configured to provide, from the registry to the first service, the at least one memory address upon determining that a channel between the first service and the second service has not been communicated.

12. The electronic device of claim 11, wherein the processor is configured to remove the channel from a list of communicated channels in the registry when the second service stops consuming packets of the at least one packet type, when the first service stops producing packets of the at least one packet type, or both.

13. A method, comprising:
   providing, from a registry to a first service, routing information to a second service and at least one packet type being consumed by the second service, wherein the first service and the second service are co-located in the memory such that the first service has access to at least one memory address of the second service;

producing, via the first service, at least one packet of the at least one packet type; and providing, from the first service to the second service, the at least one packet directly via the routing information by writing to the at least one memory address without additional routing of the at least one packet to allow the second service to consume data of the at least one packet.

14. The method of claim 13, comprising storing, via the first service, the routing information comprising the at least one memory address of the second service and the at least one packet type.

15. The method of claim 14, comprising:

providing, from the registry to the first service, routing information to the second service and at least one additional packet type, different from the at least one packet type, being consumed by the second service;

producing, via the first service, at least one additional packet of the at least one additional packet type;

providing, from the first service to the second service, the at least one additional packet to an at least one additional memory address, different from the at least one memory address, to allow the second service to consume data of the at least one additional packet.

16. The method of claim 13, wherein the routing information comprises a subset of the total direction graph in the registry.

17. The method of claim 13, comprising providing, from the registry, the at least one memory address upon determining that a channel between the first service and the second service has not been communicated.

18. The method of claim 13, comprising removing the channel from a list of channels in the registry when the second service stops consuming packets of the at least one packet type, when the first service stops producing packets of the at least one packet type, or both.

* * * * *